Patented Dec. 12, 1933

1,939,011

UNITED STATES PATENT OFFICE 1,939,011

DERIVATIVE OF THE ACRIDONE SERIES

Max Albert Kunz, Mannheim, Karl Koeberle and Anton Hensle, Ludwigshafen-on-the-Rhine, Germany, assignors to General Aniline Works, Inc., New York, N. Y., a corporation of Delaware No Drawing. Application December 5, 1929, Serial No. 411,974, and in Germany December 11, 1928

12 Claims. (Cl. 260—36)

The present invention relates to manufacture of halogen derivatives of the acridone series.

We have found that very valuable derivatives of the acridone series which have great importance as dyestuffs themselves as well as intermediate products for the manufacture of new dyestuffs are obtainable by treating with halogenating agents, which expression when used in the following description and the appended claims is meant to comprise chlorine and bromine and agents supplying these halogens, compounds having a condensed ring system of at least 5 rings comprising the acridone ring system, at least 2 further carbocyclic rings being connected to the said condensed ring system and at least two ketonic groups being contained in the whole ring system in addition to that in the acridone ring. The said further rings may be connected to the condensed ring system by simple linkages or they may also be condensed with the first condensed ring system. The compounds forming the initial material comprise, for example, compounds of the following structures:

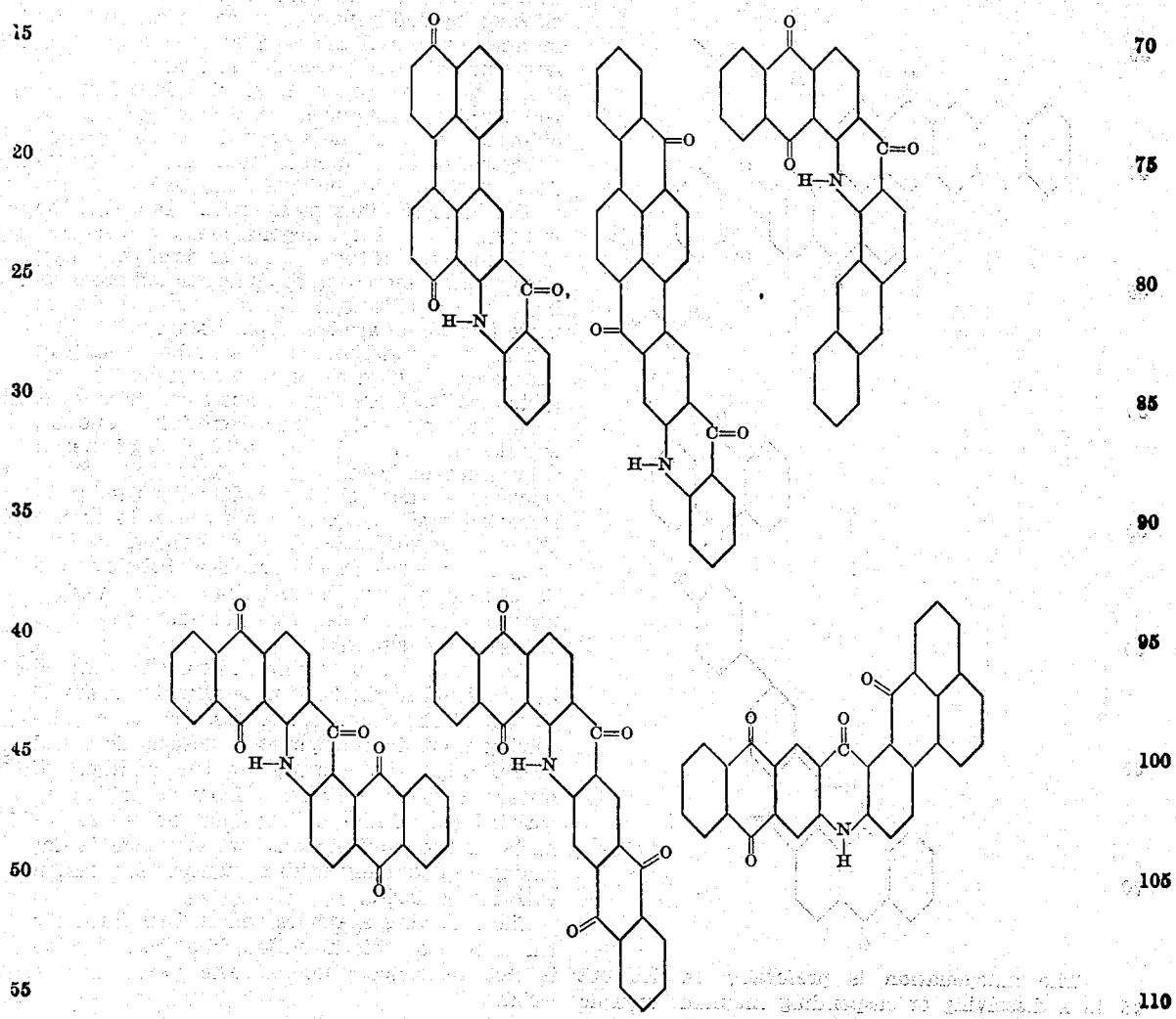

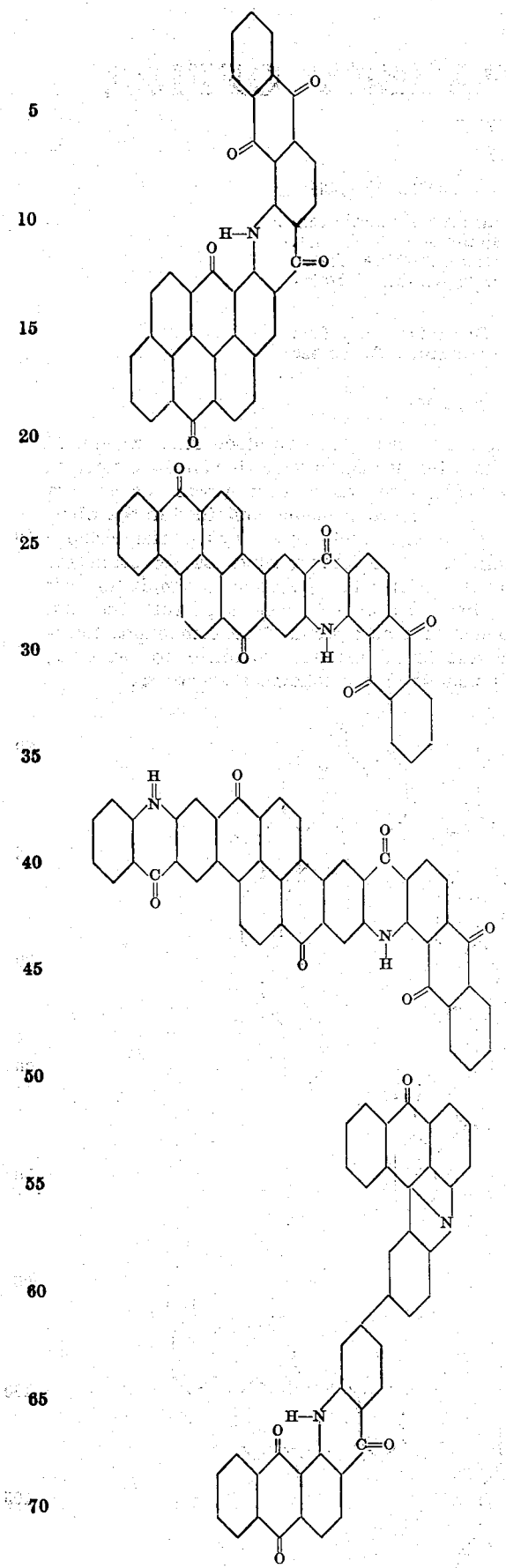

or inorganic media may be employed. As organic solvents or diluents those of high boiling point, for example nitrobenzene, nitronaphthalene, halogenated benzene, such as di- and trichlorobenzene, are preferably used. Inorganic solvents which may be used in the halogenation process comprise, for example, sulfuric acid and its derivatives, such as, for example, oleum and chlorsulfonic acid, phosphoric acid, perchloric acid or other inorganic oxygen acids known as dissolving media. The halogenation is preferably effected in the presence of a single or several halogenating catalysts, such as metals, metalloids and compounds thereof, for example iron, copper, manganese, antimony or iodine, selenium, phosphorus, sulfur and the like. In some cases the kind of catalyst and the amount thereof employed influence the shade and fastness of the dyeings obtained from dyestuffs produced with their aid.

The temperatures at which the halogenation is to be carried out largely depend on the material to be halogenated and particularly on the solvents used. Thus, the temperatures should be higher, i. e. generally speaking, above about 100° C., when the halogenation is carried out in organic solvents, but lower when halogenating in inorganic solvents, since at higher temperatures substitution by means of the inorganic solvents, for example sulfonation might take place.

When several halogen atoms are introduced, they may be of the same or of different kinds. The introduction of several halogens may be effected by halogenating in the aforedescribed manner an initial material already containing halogen, which may be produced synthetically, or by halogenating an unhalogenated initial material simultaneously or consecutively by means of chlorine and bromine or agents supplying such halogens, in the aforesaid manner. The introduction of different halogens may be carried out in the same or different solvents. As a rule the introduction of the halogens effects a considerable deepening of the shade of color of the initial product, and, moreover, the halogenated products have a better affinity for the fibre than the initial materials which are free from halogens.

The halogen derivatives of such compounds of the described kind as contain a condensed ring system of 7 or more ring members comprising the acridone ring system and containing one or, even better, two phthaloyl radicles are of special value, since the dyeings obtained therewith are particularly fast against the action of light and yield remarkably strong, clear, from brown to orange shades. Of the latter kind of halogen derivatives those derived from 1.2.5.6-diphthaloylacridone, in particular the monohalogen derivatives thereof, furnish most valuable fast orange to orange red dyeings.

The crude products obtained may be purified by the usual methods, if necessary, for example by way of the oxonium sulfates, that is, by dissolving them in concentrated sulfuric acid and precipitating the dyestuff by the addition of water, or by crystallization from or boiling up with solvents of high boiling point, or by treating pastes of the dyestuffs with oxidizing agents, for example by treating them in aqueous suspension with hypochlorite.

The following examples will further illustrate the nature of this invention, but the invention is not restricted thereto. The parts are by weight.

The halogenation is preferably carried out in a dissolving or suspending medium; organic

Example 1

45 parts of 1.2.5.6-diphthaloylacridone are dissolved in 450 parts of chlorsulfonic acid, while stirring, at room temperature. After the addition of 1.5 parts of iodine and 5 parts of iron, 40 parts of bromine are allowed to flow in. The temperature is then slowly raised to from 65° to 70° C., and the whole is kept at this temperature until the greater part of the bromine has been used up. The whole is then allowed to cool, is diluted with 225 parts of concentrated sulfuric acid, poured into ice water and boiled for a short time; the reaction product is filtered off by suction. The reaction product which contains bromine and also chlorine is a red paste which, when dry, forms an orange-red powder. It dissolves in concentrated sulfuric acid giving an orange coloration and crystallizes from nitrobenzene in the form of small red needles. It dyes cotton from a dark violet vat powerful orange-red shades of excellent fastness.

Oleum, monohydrate or sulfuric acid or even nitrobenzene may be employed as the solvent instead of chlorosulfonic acid. Instead of iodine, sulfur, antimony, manganese, phosphorus, selenium and the like may be employed as catalysts, in which cases products giving similar dyeings are obtained. The bromine may be replaced by agents supplying bromine.

Analogous reaction products are obtained when chlorine or agents supplying chlorine are employed instead of bromine or agents supplying bromine.

Example 2

50 parts of the dyestuff obtainable from the condensation product of two molecular proportions of 1-chloroanthraquinone-2-carboxylic acid and one molecular proportion of benzidine by ring closure by means of sulfuric acid are dissolved, while stirring, in 500 parts of chlorosulfonic acid and slowly heated to between 65° and 70° C. after the addition of 5 parts of sulfur and 25 parts of bromine. The reaction mixture is kept at the said temperature until all of the bromine has been used up. The reaction mixture is then allowed to cool and worked up as described in Example 1. The reaction product obtained in an excellent yield and a state of great purity contains besides bromine small amounts of chlorine. It dissolves in concentrated sulfuric acid to give an orange solution with an olive tinge and dyes cotton from a violet vat very fast red brown shades which are essentially more clear and faster than those produced by the unhalogenated initial material.

Other metalloids or metals or other halogenating catalysts may be used instead of sulfur.

Chloro derivatives are obtained in an analogous manner by introducing chlorine into the chlorosulfonic acid solution or by simply heating the said solution with halogenating catalysts, such as, for example, sulfur.

Example 3

50 parts of the initial material employed in Example 2 are treated in 500 parts of nitrobenzene after the addition of 2.5 parts of iodine and 5 parts of iron at about 160° C. with 75 parts of bromine, the reaction mixture being kept at the said temperature for several hours. The reaction mixture is then allowed to cool and worked up in the usual manner. The dyestuff thus obtained, which is a tribromo derivative according to analysis, has tinctorial properties similar to those of the dyestuff obtained according to Example 2.

Example 4

500 parts of the diphthaloyl compound of the diacridone of 3.4.8.9-dibenzopyrene-5.10-quinone, obtainable from one molecular proportion of dibromo-3.4.8.9-dibenzopyrene-5.10-quinone and 2 molecular proportions of 1-aminoanthraquinone-2-aldehyde, are dissolved, while stirring, in 5000 parts of chloro-sulphonic acid. 20 parts of iodine and 250 parts of bromine are added, and the mixture is slowly heated to between 80° and 85° C. When the bulk of the bromine employed is used up, the reaction mixture is allowed to cool and worked up as usual.

The halogenated dyestuff obtained is a red brown paste forming a brown powder when dried; it dissolves in concentrated sulfuric acid to give a blue red solution and dyes cotton from a blue vat very fast red brown shade. The crude dysteuff may be purified and obtained in crystalline form by dissolving it in concentrated sulfuric acid and fractionally precipitating its oxonium sulfate.

A reaction product dyeing stronger and more vivid shades may be obtained from an initial material purified by way of its oxonium sulfate.

Halogenation may also be effected in organic solvents.

The halogenation proceeds similarly when using as starting material the diphthaloyl compound of the diacridones obtainable from dibromoanthanthrone and 1-aminoanthraquinone-2-aldehyde or from halogenbenzanthrones and aminoanthraquinone-2-aldehydes or diacridones formed by ring closure of anthraquinone-ortho-amino-carboxylic acids, or with other compounds having an analogous structure.

Example 5

44.5 parts of the initial material employed in Example 1 are suspended in 450 parts of trichlorobenzene and heated, while stirring, to 170° C. after the addition of 4 parts of iodine, whereupon a current of chlorine is passed into the said suspension until a sample furnishes decidedly more reddish shades than the initial material. The reaction mixture is then allowed to cool and the separated reaction product is filtered off. It is a mono-chloro derivative and forms a crystalline red powder, dissolves in concentrated sulfuric acid to give an orange solution, is difficultly soluble in organic solvents and furnishes on cotton from a violet vat clear strong red-orange dyeings of very good fastness, in particular to the action of light and atmospheric influences.

The chlorination may also be effected in the absence of any halogenating catalyst, and sulfuryl chloride may be used as chlorinating agent instead of chlorine. Thus, for example, a clear red orange dyeing chloro derivative is obtained by treating the initial material in nitrobenzene with sulfuryl chloride at between 70° and 150° C.

Example 6

44.5 parts of the initial material employed in Example 1 are dissolved, while stirring, in 400 parts of sulfuric acid containing 23 per cent of sulfur trioxide, whereupon the temperature is slowly raised to between 70° and 80° C. after the addition of 17.6 parts of bromine and 4 parts of iodine. The reaction mixture is stirred until all of the bromine has been used up, allowed to cool and worked up as usual. The dibromo derivative obtained is an orange red paste forming a red powder when dried, it dissolves in concentrated sulfuric acid to give an orange solution and dyes cotton from a violet vat very fast orange red shades.

A mono-bromo derivative is obtained by the employment of 8.8 parts of bromine and a tribromo derivative by means of 25 parts of bromine, high brominated products being obtained by the addition of still more bromine.

Other metalloids or metals may be used as halogenating catalysts instead of iodine, but the halogenation may also be effected without any catalyst.

*Example 7*

10 parts of the acridone derivative obtainable by condensing one molecular proportion of monobromo - 3.4.8.9 - dibenzopyrene - 5.10-quinone which may be prepared by treating one molecular proportion of 3.4.8.9-di-benzopyrene-5.10-quinone with 1.2 atomic proportion of bromine in oleum, with one molecular proportion of 1-amino-anthraquinone-2-aldehyde and effecting ring closure, are suspended in 200 parts of trichlorobenzene and heated, while stirring, to 180° C. after the addition of 1 part of iodine. A current of chlorine is then passed for several hours into the reaction mixture which is then allowed to cool and worked up as usual. The chlorinated reaction product, which is obtained in a very good yield and a state of great purity, forms a crystalline brown powder, dissolves in concentrated sulfuric acid to give a blue red solution and dyes cotton from a blue-violet vat strong, clear red-brown shades of very good fastness.

A bromo derivative dyeing red brown shades with a somewhat more greenish tinge is obtained by brominating the initial material in nitrobenzene at 160° C. with bromine in the presence of iodine and iron.

The chlorination may be carried out by means of sulfuryl chloride instead of chlorine.

*Example 8*

20 parts of diacridone derivative, obtainable by condensing one molecular proportion of dibromo-3.4.8.9-dibenzo-pyrene-5.10-quinone with two molecular proportions of the ethyl ester of anthranilic acid and effecting ring closure, are suspended in 200 parts of nitrobenzene and treated, after the addition of 0.2 part of iodine and 0.5 part of iron, at between 165° and 180° C. with 15 parts of bromine. When all of the bromine is used up, the reaction mixture is allowed to cool and worked up as usual. The bromo derivative obtained dissolves in concentrated sulfuric acid to give a blue red solution and dyes vegetable fibres from a violet vat red brown shades of very good fastness.

A reaction product dyeing similar shades is obtained by halogenating the acridone obtainable by condensing one molecular proportion of the monobromo-3.4.8.9 - dibenzopyrene-5.10-quinone specified in the foregoing example with one molecular proportion of the methyl ester of anthranilic acid and effecting ring closure.

Bordeaux red dyeings are obtained by means of the bromination product of the acridone obtainable by condensing one molecular proportion of monobromo-4.5.8.9-dibenzopyrene-3.10-quinone with one molecular proportion of 1-amino-anthraquinone-2-aldehyde and effecting ring closure.

*Example 9*

1 part of the vat dyestuff employed as initial material in Example 2 is suspended in 10 parts of nitrobenzene; 2 parts of sulfuryl chloride are allowed to run into the mixture, drop by drop, during the course of 1 hour, while stirring, at from 60° to 70° C., and the whole is then stirred at the same temperature for another 6 hours. The reaction mixture is then poured onto ice and the solvent is expelled with steam. The vat dyestuff obtained forms a red brown powder. It dyes cotton red brown shades which are purer than those of the initial material but more dull than those of the dyestuff obtained according to Example 2.

If 0.01 part of iodine be added before the treatment with sulfuryl chloride, a dyestuff having similar properties is obtained.

Likewise, by employing 0.1 part of dimethylaniline instead of iodine a similar dyestuff is obtained.

*Example 10*

1 part of the vat dyestuff employed as the initial material in Example 2 is suspended in a solution of 0.15 part of dimethylaniline in 6 parts of sulfuryl chloride. The reaction mixture is stirred for 3 hours at 40° C. and for another 3 hours at 50° C. The sulfuryl chloride is then distilled off, the dyestuff is dissolved, while stirring, in concentrated sulfuric acid and is precipitated by pouring the sulfuric acid solution into water. The dyeings of the dyestuff thus obtained are substantially purer than those of the initial material.

*Example 11*

A stream of dry chlorine is passed in the course of 1 hour through a boiling suspension of 1 part of the vat dyestuff employed as the initial material in Example 2 in 10 parts of trichlorobenzene. The solvent is expelled with steam, and the brown powder obtained is purified by precipitating it from its sulfuric acid solution. The product obtained dyes cotton red brown shades.

By the addition of 0.01 part of iodine before the chlorination, a dyestuff is obtained which yields somewhat purer dyeings.

*Example 12*

A stream of dry chlorine is passed at from 0° to 10° C. in the course of 1 hour through a solution of 1 part of the vat dyestuff used as the initial material in Example 2 in 10 parts of chlorosulfonic acid. The dyestuff which is worked up in the usual manner yields red brown dyeings.

*Example 13*

A stream of dry chlorine is passed at from 10° to 20° C. in the course of 1 hour through a solution of 1 part of the vat dyestuff employed as the initial material in Example 2 and 0.25 part of anhydrous iron chloride in a mixture of 5 parts of chlorosulfonic acid and 5 parts of sulfuric acid monohydrate. The dyestuff thus obtained is substantially identical with that obtained according to Example 9.

What we claim is:

1. A process for manufacturing vat dyestuffs which comprises treating a compound containing a condensed ring system of at least 5 rings comprising the acridone ring system, at least two further aromatic carbocyclic rings being connected to the said condensed ring system and at least two ketonic groups being contained in the whole ring system in addition to that in the acridone ring, with a halogenating agent.

2. A process for manufacturing vat dyestuffs which comprises treating a compound containing a condensed ring system of at least 5 rings comprising the acridone ring system, at least two further aromatic carbocyclic rings being connected to the said condensed ring system and at least two ketonic groups being contained in the whole ring system in addition to that in the acridone ring, with a halogenating agent in the presence of a halogenating catalyst.

3. A process for manufacturing vat dyestuffs which comprises treating a compound containing a condensed ring system of at least 5 rings comprising the acridone ring system, at least 2 further aromatic carbocyclic rings being connected to the said condensed ring system and at least two ketonic groups being contained in the whole ring system in addition to that in the acridone ring, with a halogenating agent in the presence of an inert solvent and of a halogenating catalyst.

4. A process for manufacturing vat dyestuffs which comprises treating a compound containing a condensed ring system of at least 5 rings comprising the acridone ring system, at least 2 further aromatic carbocyclic rings being connected to the said condensed ring system and at least two ketonic groups being contained in the ring system in addition to that in the acridone ring, with a halogenating agent in the presence of an inert organic solvent and of a halogenating catalyst.

5. Chlorobromo - 1.2.5.6 - diphthaloylacridone, forming an orange-red powder crystallizing from nitrobenzene in the form of small red needles, dissolving in concentrated sulfuric acid to give an orange coloration and dyeing cotton from a dark violet vat strong, orange-red shades.

6. A process for manufacturing vat dyestuffs, which comprises treating 1.2.5.6 - diphthaloyl-acridone in a sulphuric acid with a halogenating agent in the presence of a halogenating catalyst.

7. A process for manufacturing vat dyestuffs, which comprises treating 1.2.5.6-diphthaloyl-acridone in a sulphuric acid with a bromine in the presence of iodine.

8. A process for manufacturing vat dyestuffs, which comprises treating 1.2.5.6-diphthaloyl-acridone in chlorsulfonic acid with bromine in the presence of iodine.

9. A process for manufacturing vat dyestuffs, which comprises treating an acridone of the probable structure:

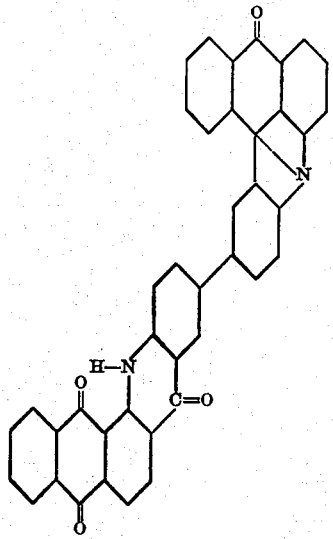

with a halogenating agent in the presence of an inert solvent and of a halogenating catalyst.

10. A process for manufacturing vat dyestuffs, which comprises treating an acridone of the probable structure:

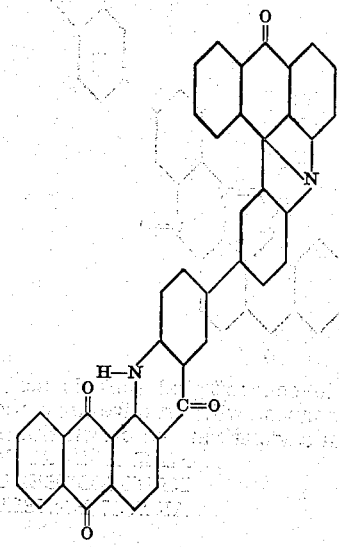

in a sulfuric acid with a halogenating agent in the presence of a halogenating catalyst.

11. Halogen derivatives of the acridone probably having the structure:

dissolving in concentrated surfuric acid to give orange solutions and dyeing cotton from violet vats red brown shades.

12. Bromo derivatives of the acridone probably having the structure:
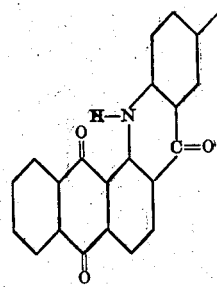
dissolving in concentrated sulfuric acid to give an orange solution with an olive tinge and dyeing cotton from a violet vat red brown shades.
MAX ALBERT KUNZ.
KARL KOEBERLE.
ANTON HENSLE.